United States Patent
Moriya

(10) Patent No.: US 7,379,141 B2
(45) Date of Patent: May 27, 2008

(54) COLOR FILTER COMPRISING RETARDATION CONTROL LAYER, METHOD FOR MANUFACTURING THE SAME, AND DISPLAY

(75) Inventor: Norihisa Moriya, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 10/882,746

(22) Filed: Jul. 1, 2004

(65) Prior Publication Data

US 2005/0142464 A1  Jun. 30, 2005

(30) Foreign Application Priority Data

Jul. 2, 2003  (JP) .............. 2003-190515

(51) Int. Cl.
G02F 1/1335 (2006.01)
(52) U.S. Cl. .................... 349/119; 349/107
(58) Field of Classification Search ........ 349/106–107, 349/117–121
See application file for complete search history.

(56) References Cited

U.S. PATENT DOCUMENTS

| 5,798,808 | A |  | 8/1998 | Van Haaren et al. | |
|---|---|---|---|---|---|
| 5,936,693 | A | * | 8/1999 | Yoshida et al. | 349/139 |
| 5,953,091 | A | * | 9/1999 | Jones et al. | 349/129 |
| 5,986,733 | A | * | 11/1999 | Winker et al. | 349/120 |
| 5,990,997 | A | * | 11/1999 | Jones et al. | 349/120 |
| 6,016,178 | A | * | 1/2000 | Kataoka et al. | 349/117 |
| 6,166,790 | A | * | 12/2000 | Kameyama et al. | 349/96 |
| 6,342,970 | B1 | * | 1/2002 | Sperger et al. | 359/587 |
| 6,665,032 | B1 | * | 12/2003 | Kikkawa | 349/117 |
| 6,768,531 | B2 | * | 7/2004 | Ochiai et al. | 349/141 |
| 2003/0001992 | A1 | * | 1/2003 | Kawase et al. | 349/106 |
| 2003/0011729 | A1 | * | 1/2003 | Song et al. | 349/107 |
| 2005/0142464 | A1 | * | 6/2005 | Moriya | 430/7 |

FOREIGN PATENT DOCUMENTS

JP  10-153802  9/1998

* cited by examiner

Primary Examiner—David Nelms
Assistant Examiner—Phu Vu
(74) Attorney, Agent, or Firm—Ladas & Parry LLP

(57) ABSTRACT

The thickness of a retardation layer made of a liquid crystalline polymer used in improving visibility in a liquid crystalline display or the like is changed every color pattern of a color filter layer laminated with the retardation layer without adding a special process therefor to realize retardation suitable for each color pattern as the problem of the invention. This problem is solved in the invention by making the total thickness of the layers 4 and 5 constant in a structure having black matrix 3, color filter layer 4 and retardation control layer 5 laminated on substrate 2, and changing the thickness of the color filter layer 4 depending on each pattern, such that each region of the retardation control layer 5 has predetermined thickness.

17 Claims, 4 Drawing Sheets

COLOR FILTER COMPRISING RETARDATION CONTROL LAYER, METHOD FOR MANUFACTURING THE SAME, AND DISPLAY

BACKGROUND OF THE INVENTION

1. Field of the Invention

The present invention relates to a color filter comprising a retardation control layer for improvement of reflection prevention properties or viewing angle and suitable for indicating various displays particularly liquid crystalline displays in color, as well as a method for manufacturing the same. The present invention relates to a display constituted of the color filter comprising a retardation control layer.

2. Description of the Related Art

Various types of displays have been practically used, and these displays are applied often by combining a retardation control layer with a linear polarizing plate or the like. For example, a circularly polarizing plate consisting of a combination of a linear polarizing plate and a ¼ wavelength retardation plate or a combination of a ½ wavelength retardation plate, a ¼ wavelength retardation plate and a linear polarizing plate is arranged at the observation side of an electroluminescence display thereby preventing light reflection to improve display contrast. In reflective liquid crystalline displays or semi-permeable and semi-reflective liquid crystalline display, a circularly polarizing plate or ellipse polarizing plate is used to utilize the light shutter effect of liquid crystalline molecules. For improving color compensation and viewing angle characteristics of supertwisted nematic mode liquid crystalline displays, retardation plates have been utilized. Particularly in vertically oriented mode liquid crystalline displays capable of high contrast display in recent years, a retardation film (negative C plate) having negative birefringence anisotropy with an optical axis perpendicular to a substrate is used in combination with a retardation film (positive A plate) having positive birefringence anisotropy with an optical axis parallel to a substrate (for example, JP-A No. 10-153802 (pages 12 to 13, FIG. 54).

As the retardation control layer in such a display, a stretched polycarbonate film, or a retardation control film obtained by applying a liquid crystalline material having birefringence anisotropy onto a triacetyl cellulose film or the like, is used, but an adhesive layer used in attaching the retardation control layer to a linear polarizing plate to form a laminate or in further attaching the laminate to a laminate display may cause light reflection, and the thickness of the retardation plate is not negligible.

Formation of a retardation layer by laminating a polymerizable liquid crystalline material on a color filter is also conceivable, but the retardation required of the retardation plate is varied depending on the color (which is actually the wavelength of transmitted light) of each pattern constituting the color filter; for example, when the central wavelength of red light is 650 nm, the central wavelength of green light is 550 nm, and the central wavelength of blue light is 450 nm, the retardation required of a ¼ wavelength retardation plate is 650/4=163 (unit: nm) for red light, 550/4=138 for green light, and 450/4=113 for blue light.

Accordingly, a linear retardation plate and a retardation plate having a retardation of 138 nm are usually used in order to realize circularly polarized light in green of highest visibility, but deviation from circularly polarized light occurs in a narrow sense in red and blue so that when a mirror surface is observed via a circularly polarizing plate made of this retardation plate under a white light source, reddish purple color is observed due to leakage of red and blue lights, which is problematic upon use in prevention of reflection. For use in improving the viewing angle characteristics of liquid crystalline displays, optical designing is conducted mainly in green so that upon indication in black subjected to compensation of viewing angle is diagonally observed, the observed black assumes reddish purple due to leakage of red and blue lights.

SUMMARY OF THE INVENTION

Accordingly, the problem of the present invention is to realize retardation suitable for each color pattern by changing the thickness of a retardation layer made of a liquid crystalline polymer, every color pattern of a color filter layer laminated with the retardation layer, without adding a process therefor.

In view of the circumstances described above, the present inventors found that the problem can be solved by forming a retardation layer having different thickness depending on each color pattern on a lower layer by applying a liquid crystalline polymer coating onto the whole surface of a color filter layer having each color pattern formed in different thickness, and can be solved by setting the thickness of each color pattern on a lower layer such that a retardation layer on each pattern has thickness determined from the retardation required of each color pattern and from birefringence Δn of its material, and the present invention is completed.

That is, the present invention provides a color filter comprising a retardation control layer having a laminate structure in which a color filter layer composed of a plurality of arranged light transmission patterns different in thickness depending on color is laminated on a substrate, and a retardation control layer consisting of a liquid crystalline polymer is laminated as one continuous layer on the color filter layer.

According to the present invention, a color filter layer composed of a plurality of arranged light transmission patterns different in thickness depending on color is laminated on a substrate, and a retardation control layer consisting of a liquid crystalline polymer is laminated as one continuous layer on the color filter layer so that without adding any special process, the thickness of the retardation control layer can be varied depending on the light transmission pattern of each color.

In the present invention, it is preferable that the total of the thickness of the color filter layer and the thickness of the retardation control layer is constant, and the thickness of the retardation control layer is varied depending on the thickness of the light transmission pattern. This is because in addition to the effect described above, the effect of the laminate of the retardation control layer can be obtained regardless of the color of the color pattern of the color filter layer as the lower layer.

In the present invention, the color filter layer is composed of the light transmission pattern of red, green and blue colors, and the thickness of the light transmission pattern of each color may be in the order of blue color>green color>red color, or in the order of red color>green color>blue color. This is because in addition to the effect described above, the effect of lamination of the retardation control layer can be obtained more reliably by the thickness of each color pattern in the order of blue color>green color>red color, or in the order of red color>green color>blue color.

In the present invention, the retardation control layer may be a retardation control layer whose optical axis is parallel to the retardation control layer. This is because in addition to the effect described above, a reflection prevention function can be conferred or the viewing angle can be improved because the retardation control layer is a retardation control layer whose optical axis is parallel to the layer.

In the present invention, the retardation control layer consists of a liquid crystalline polymer, and may comprise two layers different in functions from each other laminated on the color filter. This is because in addition to the effect described above, the color filter can have two kinds of functions in the side of the color filter because the retardation control layer has a structure in which two retardation control layers different in functions are laminated on the color filter layer.

It is preferable that out of the two layers constituting the retardation control layer, the layer opposite to the side of the color filter layer has an optical axis perpendicular to the retardation control layer. This is because in addition to the effect described above, the retardation control layer can be endowed in the side of the top surface with a function of regulating viewing angle.

It is preferable that an orientation film is sandwiched between the two layers constituting the retardation control layer. This is because in addition to the effect described above, the retardation control layer in the side of the surface can be oriented reliably because an orientation film is sandwiched between the two layers constituting the retardation control layer.

In the present invention, the retardation control layer may be a retardation control layer whose optical axis is perpendicular to the retardation control layer. This is because in addition to the effect described above, the viewing angle can be broadened upon observation at the side of the substrate because the retardation control layer has an optical axis perpendicular to the layer.

It is preferable that a retardation control layer whose optical axis is parallel to the retardation control layer is further laminated in the opposite side of the substrate to the color filter layer. This is because in addition to the effect described above, the viewing angle can be more broadened because the retardation control layer has an optical axis parallel to the layer.

In the present invention, the retardation control layer may be laminated except on a peripheral region of the substrate. This is because in addition to the effect described above, a cell gap in constituting the liquid crystalline display and a gap for attachment to various displays can be made constant because the retardation control layer is laminated except on a peripheral region of the substrate.

The retardation control layer may be laminated except on a region of the substrate to be sealed and/or a region to be laminated with an electroconductive material. This is because in addition to the effect described above, sealing reliability is not lowered in constituting the liquid crystalline display, and accurate contact is feasible in arranging an electrical contact with the opposite substrate or in arranging an electrical contact with TAB (tape auto-bonding) because the retardation control layer is laminated except on a region of the substrate to be sealed and/or a region to be laminated with an electroconductive material.

Further, the present invention provides a display having the color filter comprising a retardation control layer as described above. The display according to the present invention can exhibit the effect described above.

Further, the present invention provides an electroluminescence display having the color filter comprising a retardation control layer as described above. The electroluminescence display according to the present invention can exhibit the effect described above.

Further, the present invention provides a liquid crystalline display having the color filter comprising a retardation control layer as described above. The liquid crystalline display according to the present invention can exhibit the effect described above.

Further, the present invention provides a vertically oriented mode liquid crystalline display having the color filter comprising a retardation control layer as described above. The vertically oriented mode liquid crystalline display according to the present invention can exhibit the effect described above.

Further, the present invention provides a method for manufacturing a color filter comprising a retardation control layer, which comprises arranging on a substrate a plurality of light transmission patterns different in thickness depending on color, to form a color filter layer, and then laminating a retardation control layer consisting of a liquid crystalline polymer as one continuous layer on the color filter.

According to the present invention, a plurality of light transmission patterns different in thickness depending on color is formed on a substrate, to form a color filter, and a retardation control layer consisting of a liquid crystalline polymer is formed as one continuous layer on the color filter, and thus the thickness of the retardation control layer can be changed for the light transmission pattern of each color without adding any special process.

DESCRIPTION OF THE PREFERRED EMBODIMENT

Hereinafter, the present invention is described in detail.

Figure 1:
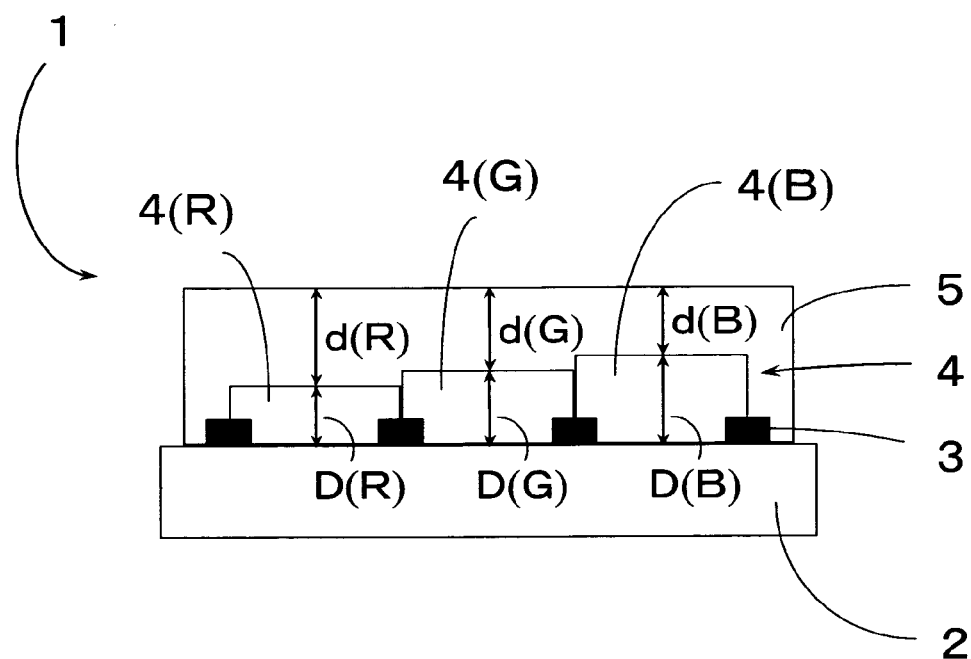
FIG. 1 is a schematic sectional view of one example of the color filter having a retardation control layer according to the present invention.
Figure 2:
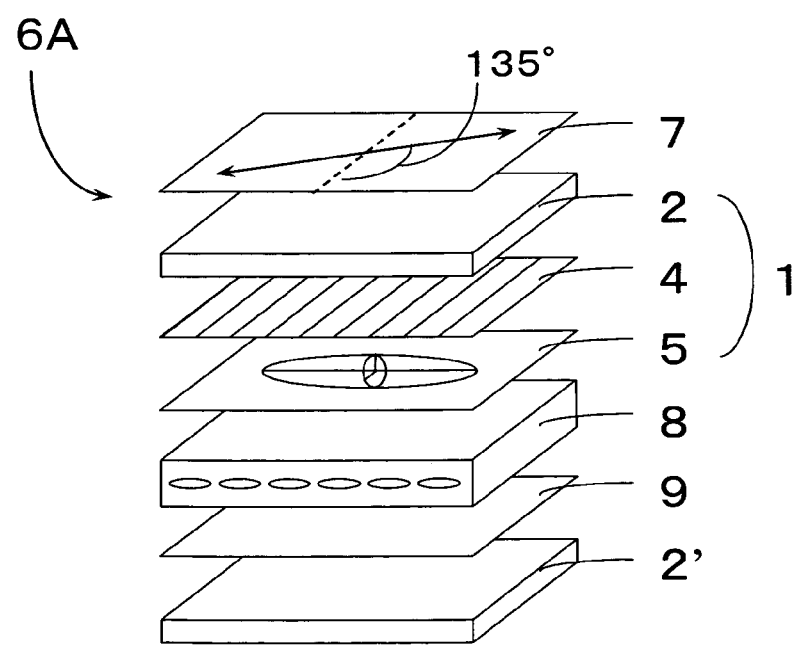
FIG. 2 shows one example of the liquid crystalline display of the present invention.

FIG. 1 shows each layer used in combination with a linear polarizing plate, in which a ¼ wavelength retardation layer for obtaining circularly polarized light was applied directly to a color filter layer, and FIG. 2 shows a section of the preferably used reflective liquid crystalline display having a color filter (or a color filter substrate) having a retardation control layer according to the present invention.

As shown in FIG. 1, the color filter 1 having a retardation control layer according to the present invention has a laminate structure in which pixel regions are openings on transparent substrate 2, and black matrix 3 composed of light-shielding material in positions corresponding to non-pixel regions is laminated on the substrate, and color filter layer 4 constituted by arranging color patterns of light transmission red pattern 4(R), green pattern 4(G) and blue pattern 4(B) on positions corresponding to the openings along the black matrix 3 is laminated on the substrate, and on the color filter layer 4, a retardation control layer 5 consisting of a liquid crystalline polymer is laminated as one continuous layer.

In the present specification, the liquid crystalline polymer refers to the one whose crystalline state is fixed at room temperature, and for example to the one in which liquid crystalline monomers having a polymerizable group in their molecular structure are crosslinked and hardened while optical anisotropy before crosslinking is maintained, or to polymeric liquid crystals having a glass transition temperature, which upon heating at the glass transition temperature or more, shows a liquid crystalline phase, and thereafter upon cooling to the glass transition temperature or less, can freeze the liquid crystalline texture. Hereinafter, the "light transmission" may be omitted with respect to each color pattern constituting the color filter layer 4. The letters "R", "G" and "B" refer hereinafter to red, green and blue, respectively.

In this example, the retardation control layer 5 has an optical axis parallel to the retardation control layer 5, and its top surface is a flat surface parallel to the top surface of the substrate 2. In the present invention, the retardation control layer is laminated preferably by coating the whole surface of the substrate with a coating composition for forming the retardation control layer, and the thickness D of each color pattern is decreased in the order of the thickness D (B) of the blue pattern 4 (B), the thickness D (G) of green pattern 4 (G) and the thickness D (R) of red pattern 4 (R), and the respective patterns are different in thickness from one another; that is, the thickness is varied depending on color, and as a result, the thickness d of the retardation control layer 5 on the color filter layer 4 is increased in the order of the thickness d (B) on blue pattern 4 (B), the thickness d (G) on green pattern 4 (G) and the thickness d (R) on red pattern 4 (R).

As described above, the retardation required of the ¼ wavelength retardation plate is 650/4=163 (unit: nm) for red light, 550/4=138 for green light, and 450/4=113 for blue light, and when the thickness on blue pattern 4B of the ¼ wavelength retardation plate is d(B), the thickness on green pattern 4G is d(G) and the thickness on red pattern 4R is d(R), it is preferable that $\Delta n(R) \times d(R) = 163$, $\Delta n(G) \times d(G) = 138$, and $\Delta n(B) \times d(B) = 113$. Each of $\Delta n(R)$, $\Delta n(G)$ and $\Delta n(B)$ is a difference between the refractive index, in the direction of the optical axis, of the material constituting the retardation control layer 5 and the refractive index thereof in the direction perpendicular thereto, and thus it is preferable that $d(R) = 163/\Delta n(R)$, $d(G) = 138/\Delta n(G)$, and $d(B) = 113/\Delta n(B)$.

For constituting the retardation control layer 5 such that its top surface is flat, it is preferable that the total of the thickness of the color filter layer 4 and the thickness of the retardation control layer 5 is constant value S, and also that the thickness D of color patterns R, G and B constituting the color filter layer 4 is set to have the following relationships; $D(R) = S - d(R)$, $D(G) = S - d(G)$, and $D(B) = S - d(B)$.

Each color pattern constituting the color filter layer 4 and the thickness of each layer in the retardation control layer 5 can be deviated from values derived from the above relationships, owing to coating conditions and solvent evaporation in forming the layer or shrinkage upon hardening. When the retardation control layer 5 is formed by coating on the surface of the color filter layer 4 having unevenness, the surface of the formed retardation control layer 5 may be influenced slightly by the unevenness of the lower layer 4, and as a result, the resulting retardation control layer 5 may be thin in a region where it should be formed as a thick layer. In consideration of these aspects and for realizing different retardation depending color, the thickness d(B), d(G) or d(R) of the retardation control layer 5 on each pattern is preferably ±20% or less, more preferably ±15% or less, based on the theoretical value.

Because the thickness, on each pattern of the color filter layer 4, of the retardation control layer 5 arranged by coating on the whole surface of the substrate can be deviated from the theoretical value, a color pattern where the retardation control layer might be formed to be thin due to unevenness of the lower layer can be formed to be so thin as to allow the retardation control layer to be formed as a thick layer thereon.

In the present invention, the color filter 1 preferably has the retardation control layer 5 having different thickness depending on the thickness of the light transmission pattern and having a flat top surface parallel to the top surface of the substrate 2, in which the total of the thickness of the color filter and the thickness of the retardation control layer is constant, and a color filter having the retardation control layer whose thickness is preferably ±20% or less, more preferably ±15% or less, based on the theoretical value is regarded as the one in which "the total of the thickness of the color filter and the thickness of the retardation control layer is constant", and shall be included within the scope of the invention.

FIG. 2 shows one example of the liquid crystalline display to which the color filter 1 having a retardation control layer as shown in FIG. 1 was applied. The upper side of the liquid crystalline display 6A in FIG. 2 is in the side of a viewer, and from the side of a viewer, polarizing plate 7, one transparent substrate (A) 2, color filter layer 4, retardation control layer 5, liquid crystalline layer 8, reflective layer 9, and opposite substrate (B) 2' are arranged in this order, and the liquid crystalline display 6A is a reflective type visible upon lightening from the side of a viewer. Among the respective layers, three layers i.e. one transparent substrate (A) 2, color filter layer 4 and retardation control layer 5 are arranged in this order to form a laminate, that is, the color filter 1 having a retardation control layer.

Similar to the view of the color filter 1 having a retardation control layer, the views of liquid crystalline displays below, including this view, are set forth to indicate the relative positional relationship of the respective layers, and the respective layers are not always separated as shown in the views.

Although not shown in the views, the structures described above have been subjected to the following processing as is usually carried out for liquid displays. First, the polarizing plate 7 is attached preferably via an adhesive layer to the substrate (A) 2, and the reflective layer 9 is also laminated on the substrate (B) 2'. The substrate (A) 2 is usually accompanied by black matrix 3, and is preferably accompanied by black matrix 3. An electrode is formed in the side where the substrate (A) 2 and substrate (B) 2' are opposite to each other, and both the substrates 2 and 2' while maintaining a narrow gap between the retardation control layer 5 and reflective layer 9 are sealed at the periphery thereof. Liquid crystals are encapsulated into the sealed inside so that the liquid crystalline layer 8 is laminated therein. An orientation film is preferably formed at the side where the retardation control layer 5 and the reflective layer 9 are opposite to each other.

By applying the color filter having a retardation control layer described by reference to FIG. 1 to the liquid crystalline display 6A shown in FIG. 2, light entering through the polarizing plate 7, the one transparent substrate (A) 2 and the color filter layer 4 in this order from the viewer's side becomes circularly polarized light upon passing through the retardation control layer 5, and the thickness of each region in the retardation control layer 5, corresponding to each color light, has been optimized so as to give circularly polarized light for each of red light, green light and blue light, thus enabling highly contrast display.

In the liquid crystalline display 6A described above, the thickness of the retardation control layer different in thickness depending on the respective color patterns constituting the color filter layer 4 can be regulated by regulating the thickness of a coating in forming each pattern from a photosensitive resin composition and then applying a predetermined amount of a retardation control layer-forming composition, followed by exposure to predetermined light thereby regulating the thickness of the retardation control layer 5 depending on each color pattern on the lower layer, and it is thus not necessary to form the retardation control layers 5 of different thickness separately for each color pattern.

For production of the liquid crystalline display 6A, each color pattern constituting the color filter layer 4 and the retardation control layer 5 should have predetermined thickness respectively, and the retardation control layer 5 can be formed as a layer as thin as several μm or less without any additional process other than the process of laminating each layer. Hence, as compared with the case where the conventional retardation control plate is used, the difference in thickness between the retardation control plate and the retardation control layer, and the whole of the liquid crystalline display 6A including an adhesive layer which is usually thick, can be considerably reduced.

Figure 3:
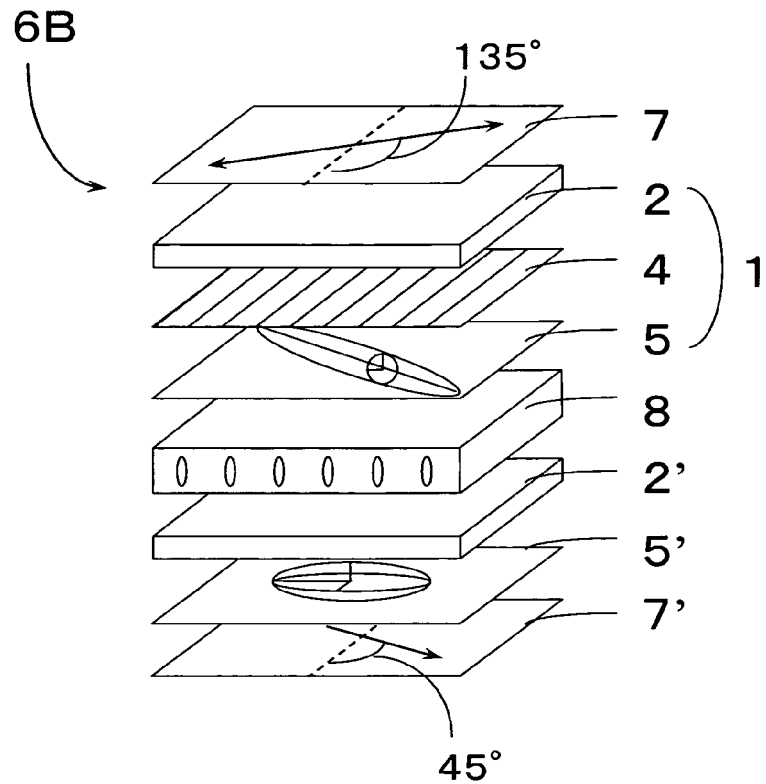
FIG. 3 shows another example of the liquid crystalline display of the present invention.

FIG. 3 shows another example of the liquid crystalline display to which the color filter 1 having a retardation control layer as shown in FIG. 1 was applied. The upper side of the liquid crystalline display 6B in FIG. 3 is also in the side of a viewer, and from the side of a viewer, polarizing plate 7, one transparent substrate (A) 2, color filter layer 4, retardation control layer 5 consisting of a liquid crystalline polymer, liquid crystalline layer 8, opposite substrate (B) 2', another retardation control layer 5' consisting of a liquid crystalline polymer, and another polarizing plate 7' are arranged in this order, and the liquid crystalline display 6B is a transmission type viewable by lightening in the opposite side of a viewer, i.e. in the backside. Among the respective layers, three layers i.e. the one transparent substrate (A) 2, the color filter layer 4 and the retardation control layer 5 are laminated to form a laminate, that is, the color filter 1 having a retardation control layer. As shown in FIG. 3 and in FIGS. 5 and 7 referred to hereinafter, both the retardation control layer (negative C plate) 5' having negative birefringence anisotropy with an optical axis perpendicular to the retardation control layer and the retardation control layer (positive A plate) 5 having positive birefringence anisotropy with an optical axis parallel to the retardation control layer are simultaneously used for improvements in viewing angle of the vertically oriented mode liquid crystalline display.

When observed in the azimuthal angle in the center of the angle between the two polarizing plates and simultaneously at an observation angle of 60° upon indication in black (voltage off), the retardation of each of the vertically oriented liquid crystal, the negative C plate and the positive A plate necessary for compensation of viewing angle is shown for red, green and blue in Table 1. The azimuthal angle is an angle in plane parallel to the retardation control layer, and the observation angle is an inclined angle relative to a perpendicular line to the retardation control layer.

TABLE 1

| | Red (650 nm) Retardation/ thickness | | Green (550 nm) Retardation/ thickness | | Blue (450 nm) Retardation/ thickness | |
|---|---|---|---|---|---|---|
| Vertically oriented liquid crystal | 135 nm | 3.8 μm | 143 nm | 3.8 μm | 170 mn | 3.8 μm |
| Negative C plate | 67.6 nm | 2.3 μm | 86.0 nm | 2.4 μm | 123.4 nm | 2.6 μm |
| Positive A plate | 118.2 nm | 0.86 μm | 100.0 nm | 0.70 μm | 82.4 nm | 0.5 μm |

In the negative C plate as shown in Table 1, the necessary thickness is decreased in the order of blue, green and red. In the positive A plate, the necessary thickness is decreased in the order of red, green and blue.

Figure 5:
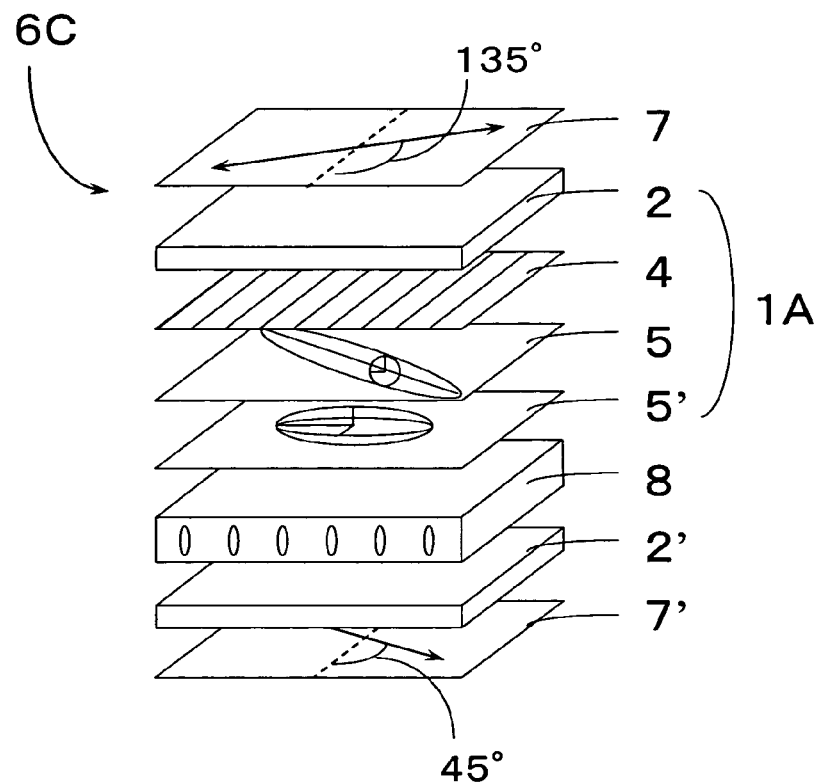
FIG. 5 shows another example of the liquid crystalline display of the present invention.

It follows that when the positive A plate 5 is laminated adjacent to the color filter layer 4 (as shown in FIGS. 3 and 5), the thickness of each color pattern constituting the color filter layer 4 is preferably set to be blue>green>red in order that the thickness of the positive A plate 5 is decreased in the order of red, green and blue.

Figure 7:
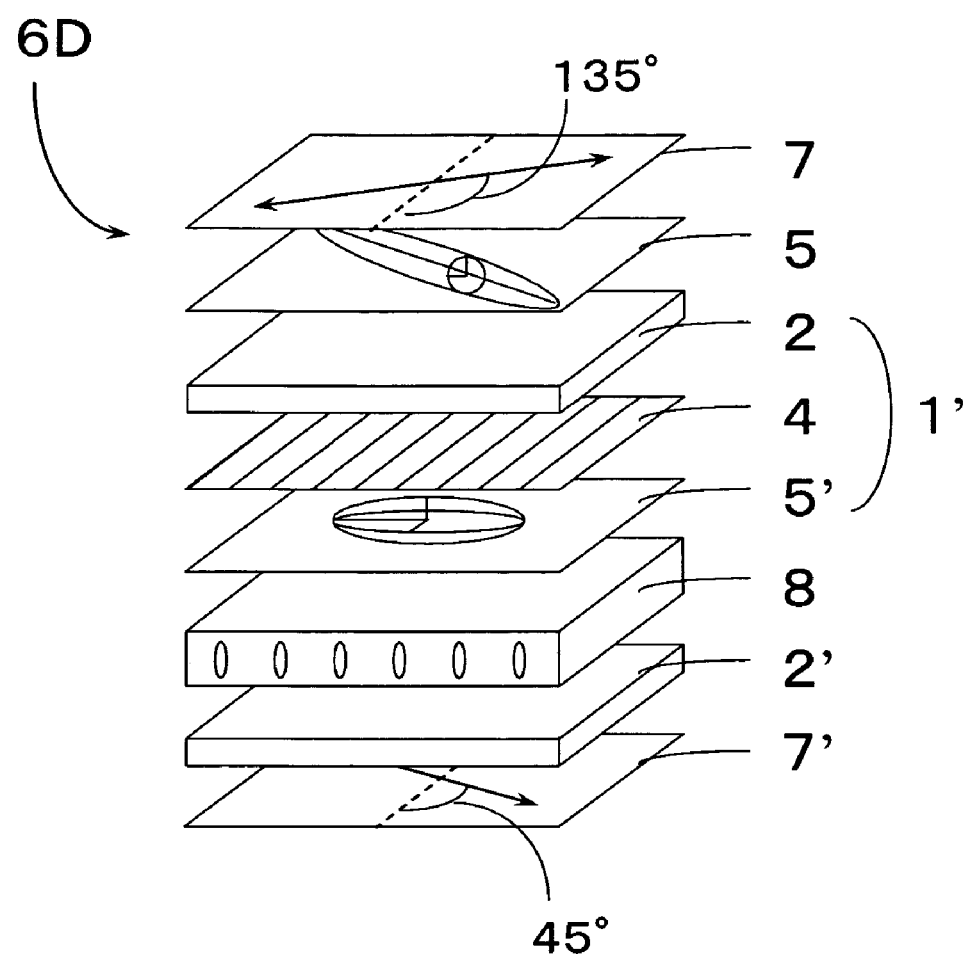
FIG. 7 shows another example of the liquid crystalline display of the present invention.

When the negative C plate 5' is laminated adjacent to the color filter layer 4 (as shown in FIG. 7), the thickness of each color pattern constituting the color filter layer 4 is preferably set to be red>green>blue in order that the thickness of the negative C plate 5' is increased in the order of red, green and blue.

In the structure described by reference to FIG. 3, it is preferable that the retardation control layer 5' is laminated directly on the undersurface of the substrate (B) 2'. As the retardation control layer in this case, a conventional retardation control layer may be laminated via an adhesive layer, but is preferably a thin film composed of a liquid crystalline polymer. The polarizing plate 7' may be stuck via an adhesive layer. An orientation film may also be formed in the sides of the retardation control layer 5 and the substrate (B) 2' which are opposite to each other. Out of the two polarizing plates, the polarizing plate 7 in the side of an observer has an absorption axis for example at an angle of 135° in an anticlockwise direction relative to the direction from the fore to back in the view, and the polarizing plate in the backside has an absorption axis at an angle of 45° in an anticlockwise direction relative to the direction from the fore to back in the view, and the absorption axis of the polarizing plate 7 is vertical to the absorption axis of the polarizing plate 7'.

The liquid crystalline display 6B shown in FIG. 3 is a transmission display through which light can pass, and the upper side in the view is in the side of an observer with lighting at the backside. The liquid crystalline display 6B has the retardation control layers 5 and 5' by which the viewing angle can be broadened, that is, the visible angle is in a broad range.

Figure 4:
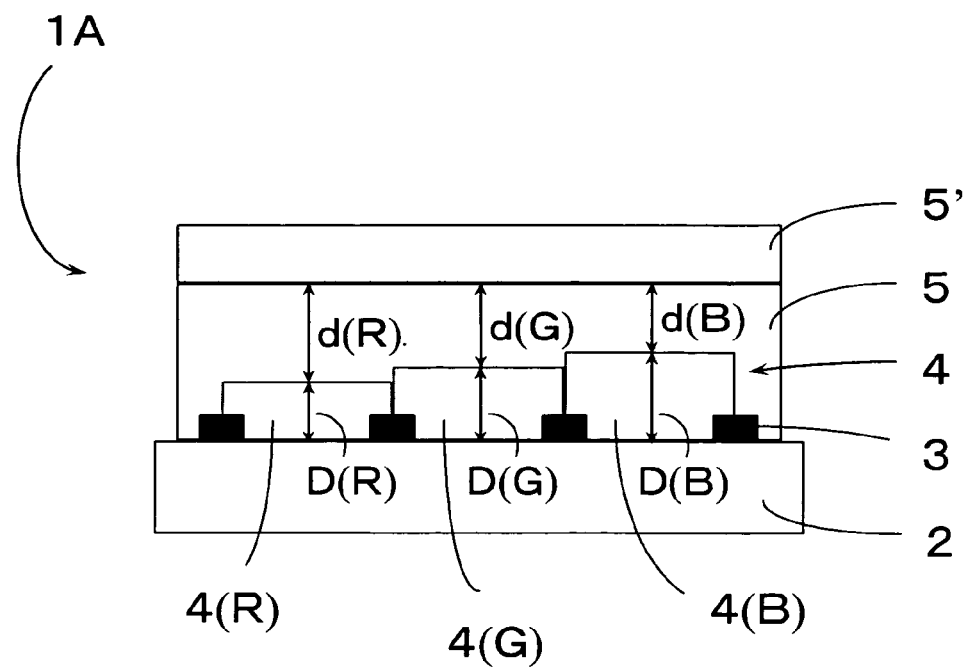
FIG. 4 is a schematic sectional view of another example of the color filter having a retardation control layer according to the present invention.

The two retardation control layers 5 and 5' may be arranged such that they are separated by the liquid crystalline 8 and the substrate (B) 2', as shown in FIG. 3, or the two retardation control layers 5 and 5' may have a 2-layer laminate structure such that they are contacted with each other and laminated on the color filter layer 4, as shown in FIG. 4. That is, the black matrix 3, the color filter layer 4, and the retardation control layers 5 and 5' consisting of liquid crystalline polymers may be laminated in this order on the substrate 2 to form a laminate structure as the color filter 1A having the retardation control layers.

The laminate structure of the substrate 2, the black matrix 3, the color filter layer 4, and the retardation control layer 5 consisting of a liquid crystalline polymer, described by reference to FIG. 4, is the same as described by reference to FIG. 1. Another retardation control layer 5' consisting of a liquid crystalline polymer is a layer of uniform thickness laminated on the retardation control layer 5, and if necessary an orientation film may be sandwiched between the retardation control layers 5 and 5'.

The color filter 1A having a retardation control layer as described above can be applied to constitute the liquid crystalline display 6C shown in FIG. 5. The liquid crystalline display 6C is the same as the liquid crystalline display 6B described by reference to FIG. 3 except that the two retardation control layers 5 and 5' are laminated directly.

In the example described by reference to FIG. 1, the thickness d of the retardation control layer 5 whose optical axis is parallel to the layer is increased preferably in the order of the thickness d(B) on the blue pattern 4(B), the thickness d(G) on the green pattern 4(G), and the thickness d(R) on the red pattern 4(R) and in the retardation control layer 5' whose optical axis is perpendicular to the layer, the thickness on each pattern in the color filter layer 4 is also preferably changed In this case, the thickness d should be increased in the order of the thickness d(R) on the red pattern 4 (R), the thickness d(G) on the green pattern 4 (G) and the thickness d(B) on the blue pattern 4(B), as shown by reference to FIG. 6.

For constituting the retardation control layer 5' such that the top surface is flat, the thickness D of each color pattern and the thickness d of the retardation control layer 5 thereon, similar to those described by reference to FIG. 1, are preferably set such that the total of the thickness of the color filter layer 4 and the thickness of the retardation control layer 5' is a certain constant value S', and the thickness D of each of color patterns R, G and B constituting the color filter layer 4 meets the following relationships: $D(R)=S'-d(R)$, $D(G)=S'-d(G)$, and $D(B)=S'-d(B)$.

Figure 6:
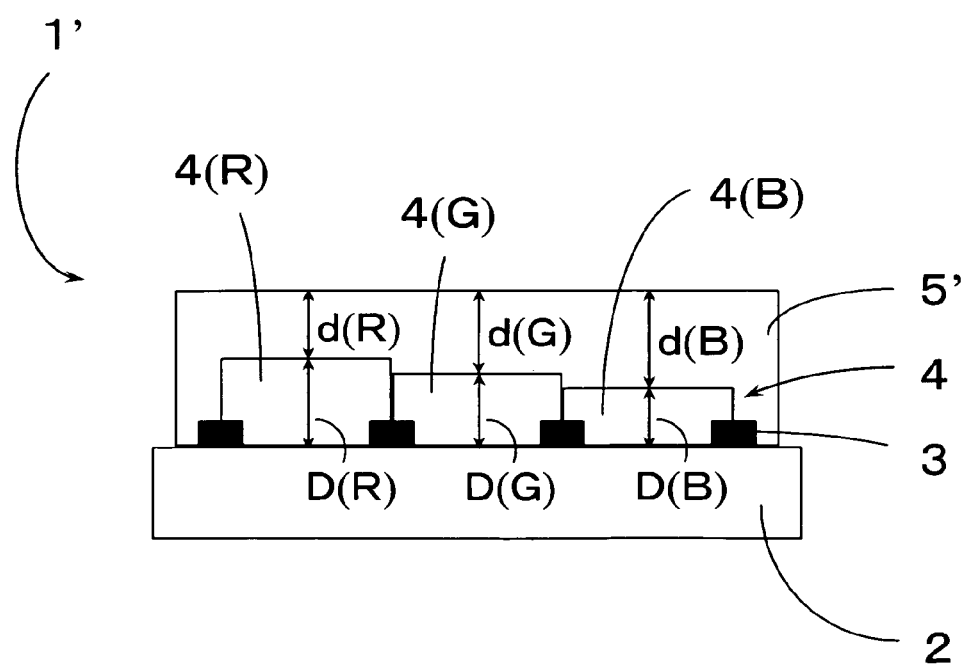
FIG. 6 is a schematic sectional view of another example of the color filter having a retardation control layer according to the present invention.

In FIG. 6, 1' is a color filter having a retardation control layer.

FIG. 7 shows a liquid crystalline display 6D using the color filter 1' having a retardation control layer according to the present invention in which the retardation control layer 5' having an optical axis perpendicular to the layer is arranged on the color filter layer 4, and the liquid crystalline display 6D is the same as described by reference to FIG. 5 except that the retardation control layer 5 is arranged not in the side of the substrate (A) but in the side of a viewer. When the retardation control layer (positive A plate) 5 whose optical axis is parallel to the layer and the retardation control layer (negative C plate) 5' whose optical axis is perpendicular to the layer, upon application to the liquid crystalline display, may be arranged in any way unless the retardation control layer (positive A plate) 5 whose optical axis is parallel to the layer is arranged between the liquid crystalline layer 8 and the retardation control layer (negative C plate) 5' whose optical axis is perpendicular to the layer. For example, the liquid crystalline layer, the retardation control layer (negative C plate) and the retardation control layer (positive A plate) may be arranged in this order from the backlight side (backside), or the retardation control layer (positive A plate), the liquid crystalline layer, and the retardation control layer (negative C plate) may be arranged in this order from the backlight side, and in either arrangement, the liquid crystalline layer and the retardation control layer (negative C plate) may be exchanged with each other.

When the two retardation control layers 5 and 5' different in optical properties are used as described above, either one can laminated on the color filter layer 4 different in thickness for each color pattern thereby changing the thickness of a part corresponding to each color pattern, so that out of the two retardation control layers, one having a higher compensation effect may be selected and laminated on the color filter 4.

In the forgoing, the substrates 2 and 2' are composed of inorganic base materials such as glass, silicon or quartz, or organic base materials including acrylates such as polymethyl methacrylate etc., polyamide, polyacetal, polybutylene terephthalate, polyethylene terephthalate, polyethylene naphthalate, triacetyl cellulose, syndiotactic polystyrene, polyphenylene sulfide, polyether ketone, polyether ether ketone, fluorine resin, polyether nitrile, polycarbonate, modified polyphenylene ether, polycyclohexene, polynorbornene resin, polysulfone, polyether sulfone, polysulfone, polyallylate, polyamide imide, polyether imide and thermoplastic imide, and substrates made of general plastics can also be used. The thickness of substrate 2 is not particularly limited, but is generally about 5 µm to 1 mm depending on intended use.

Black matrix 3 can be formed by applying a resin coating composition containing a black coloring agent onto the whole surface of the substrate, solidifying it once and coating it with a photoresist, or by applying a photosensitive resin coating composition containing a black coloring agent and exposing it to light, followed by development thereof. Thus black matrix can be formed from a resin composition containing a black coloring agent.

Alternatively, black matrix 3 can also be formed by deposition, ion plating or spattering a 2-layer chrome black matrix consisting of a laminate structure of CrOx/Cr (x is an arbitrary number, and "/" is an interface between layers laminated) or a 3-layer chrome black matrix of lower reflectance consisting of a laminate structure of CrOx/CrNy/Cr (each of x and y is an arbitrary number) to form a thin film of metal, metal oxide or metal nitride depending on necessity, and then patterning thereof in photolithography, or by electroless plating or printing with a black ink composition. The thickness of black matrix 3 is about 0.2 to 0.4 µm in the case of thin film, or about 0.5 to 2 µm by printing.

Each color pattern of the color filter layer 4 may be arranged on each opening of the black matrix 3. For the sake of convenience, each color pattern may be arranged in the form of a band in the direction from the fore to back in FIG. 1. The color filter layer 4 may be formed by preparing ink compositions colored in predetermined color and then printing them for the respective color patterns, more preferably by photolithography using photosensitive resin coating compositions containing a coloring agent of predetermined color. The thickness of the color filter layer 4 is about 1 to 5 µm.

The thickness of each color pattern in a general color filter layer is not positively varied, but in the present invention, the thickness should be varied depending on the color of each color pattern in the color filter layer 4 as a lower layer in order to change the thickness of the retardation control layer 5. The ratio of the coloring agent contained into the photosensitive resin composition is decreased for a region of greater thickness than usual, while the ratio of the coloring agent contained is increased in a region of smaller thickness than usual. The thickness of a coating of the photosensitive resin composition is regulated by changing coating conditions or printing conditions in the coating method or silk screen printing method. When the thickness of the coating is changed depending on the viscosity of the photosensitive resin composition, the viscosity of the photosensitive resin composition is suitably selected.

Prior to formation of the retardation control layer 5 or 5' on the color filter layer 4, an orientation film is formed if necessary. The orientation film is arranged by which the liquid crystalline polymer used in constituting the retardation control layer 5 or 5' is oriented in a predetermined direction, and the orientation film can be formed by forming a coating of resin such as polyamide resin or polyimide resin by applying and drying a resin composition containing such resin dissolved therein, and then rubbing it in a predetermined direction against a roller having a cloth wound thereon. When two retardation control layers are laminated, an orientation film is preferably sandwiched between the first and second layers.

As the retardation control layer 5 or 5', a retardation control layer whose optical axis is parallel to the layer can be formed by polymerizing polymerizable liquid crystalline monomers, specifically by applying a photopolymerizable liquid crystalline composition having such monomers compounded with a photopolymerization initiator, onto the whole surface of the color filter layer 4 and exposing it to UV rays to form a continuous one layer laminated thereon, and the retardation control layer 5 whose optical axis is perpendicular to the layer can be formed and laminated in the same manner by using a photopolymerizable liquid crystalline composition further compounded with a polymerizable chiral agent.

The polymerizable liquid crystalline monomers may be those disclosed in, for example, Japanese Patent Application Laid-Open (JP-A) No. 10-508882, and the polymerizable chiral agent may be the one disclosed in, for example, JP-A No. 7-258638, and more specifically the polymerizable liquid crystalline monomers can be exemplified by those represented by the following formulae (1) to (11) and the polymerizable chiral agent by those represented by the following formulae (12) to (14).

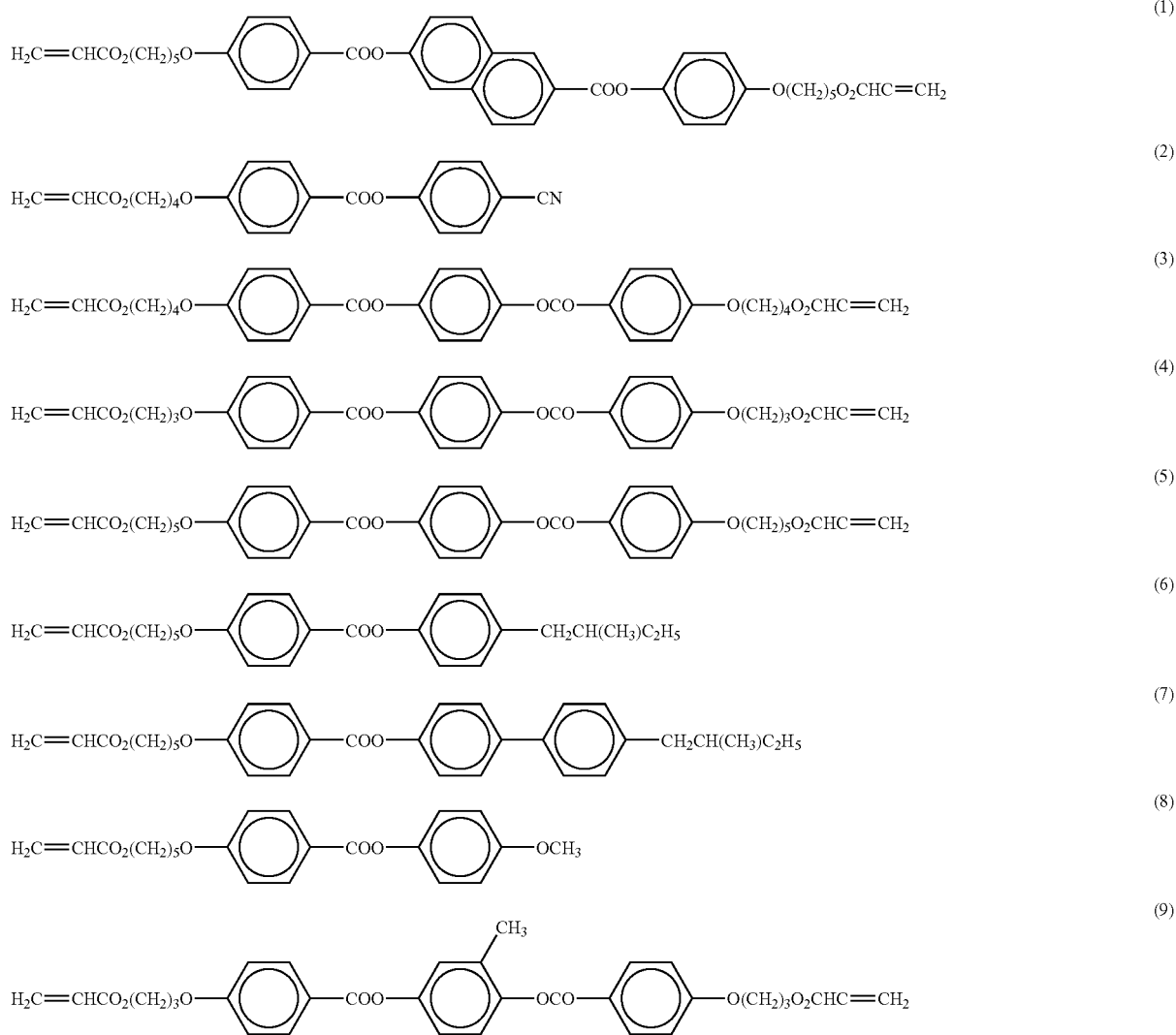

-continued
(10)
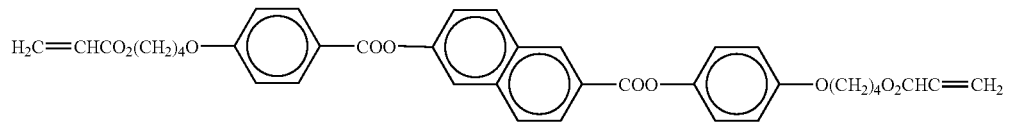
(11)
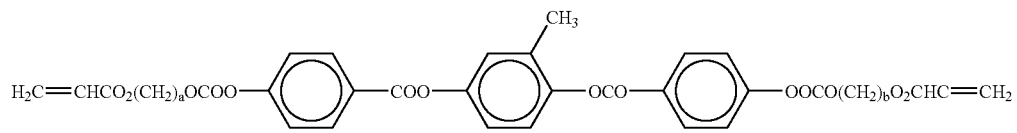
(12)
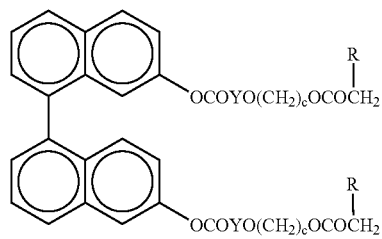
(13)
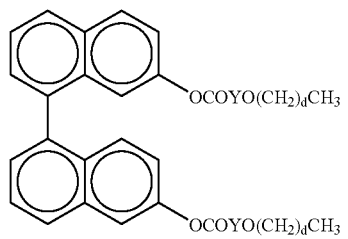
(14)
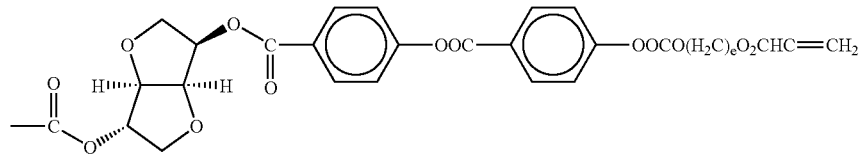
(i)
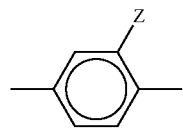
(ii)
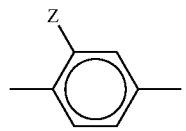
(iii)
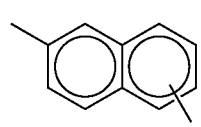
(iv)
(v)
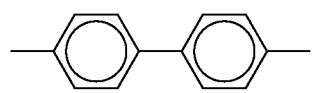
(vi)
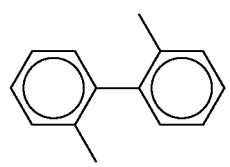
(vii)
(viii)
(ix)
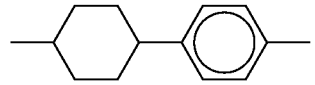
(x)
(xi)
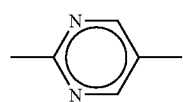
(xii)
(xiii)
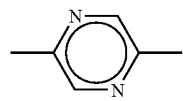
(xiv)

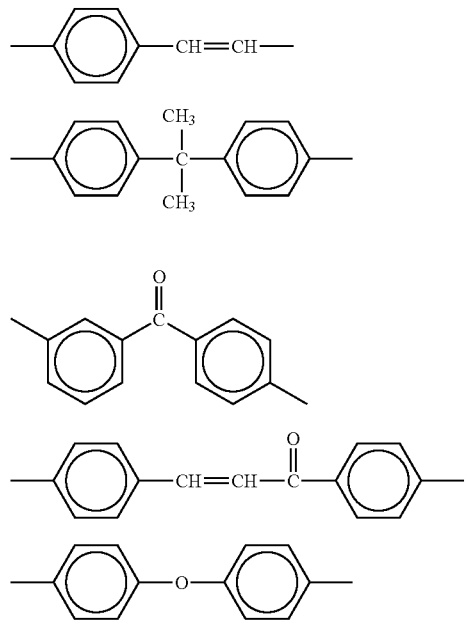

In the above formulae (11) to (14), each of a to e representing the number of methylene groups (chain length of the alkylene group) is an integer, whereupon a or b is 2 to 12, more preferably 4 to 10, still more preferably 6 to 9; c or d is 2 to 12, more preferably 4 to 10, still more preferably 6 to 9; and e is preferably 2 to 6. Y in formulae (12) and (13) is any one of formulae (i) to (xxiv) in formulae (15) and (16), more preferably any one of formulae (i), (ii), (iii), (v) and (vii).

The retardation control layer 5 or 5' is formed by applying the photopolymerizable liquid crystalline composition described above which is if necessary dissolved or diluted with a solvent, onto the color filter layer 4 by spin coating, die coating, slit coating or another suitable method, followed by polymerization thereof by irradiation with UV rays.

The retardation control layers 5 and 5' may be present on each layer constituting the color filter layer 4, and thus may laminated on only an effective display area including the color filter layer 4 and the black matrix 3 by pattern light exposure so as to leave a peripheral region of substrate 2. By doing so, the retardation control layers 5 and 5' can be formed to be thick on the peripheral region of the substrate 2, and solve the problem that cell gap in constituting a liquid crystalline display and a gap in attachment to various displays cannot be made constant. The retardation control layers 5 and 5' are laminated preferably on a region excluding a region of substrate 2 to be sealed and/or a region to be laminated with an electroconductive material in constituting a liquid crystalline display. If the retardation control layer is present in such regions, a sealing agent and an electroconductive material on the upper and lower substrates may fail to attain sufficient seal reliability or to secure an electrical contact with the opposite substrate or an electrical contact with TAB (tape auto-bonding) where the soft retardation control layer is present as lower layer.

When the retardation control layer 5 or 5' is formed on the color filter layer 4 in the present invention, the thickness of the lower color filter layer 4 has been varied and uneven depending on each color pattern, and thus the unevenness of the lower layer can affect a composition applied thereon so that the top surface of the composition layer is not be necessarily flat. Accordingly, the surface of a coating of the composition is covered if necessary with a film or a glass plate, to forcibly render the top surface of the composition flat with the surface of the film or glass plate.

The color filter having a retardation control layer according to the present invention has been described mainly by referring to application thereof to a liquid crystalline display, particularly a color liquid crystalline display, but the color filter having a retardation control layer according to the present invention can also be applied to a self-emitting display, that is, an organic luminescence display, field emission display or plasma display.

The present invention is not limited to the embodiments described above. These embodiments are set forth for illustrative purposes, and those having substantially the same constitution as in the technical idea described in the claims in this invention and exhibiting the same working effect as in this invention are included in the technical scope of this invention.

EXAMPLES

Hereinafter, the present invention is described in more detail by reference to the Examples and Comparative Examples.

Example 1

Color Filter with Circularly Polarized Light Functions

Each photosensitive resin composition (referred to hereinafter as photoresist) for forming a black matrix formed on a substrate or each color pattern of color filter layer was prepared. Each photoresist was prepared by adding beads to a pigment, a dispersant and a solvent and dispersing the mixture for 3 hours with a paint shaker as a dispersing machine, removing the beads to give a dispersion, and mixing the dispersion with a resist composition consisting of a polymer, a monomer, an additive, initiators and a solvent. The composition of each photoresist is shown below. The "parts" is expressed on a weight basis.

<Black matrix forming photoresist>

| | |
|---|---|
| Black pigment | 14.0 parts |
| (TM Black #9550 manufactured by Dainichiseika Color & Chemicals Mfg. Co., Ltd.) | |
| Dispersant | 1.2 parts |
| (Disper Big 111 manufactured by BYK Chemie Japan K.K.) | |
| Polymer | 2.8 parts |
| ((Meth)acrylate resin VR60 manufactured by SHOWA HIGHPOLYMER CO., LTD.) | |
| Monomer | 3.5 parts |
| (Multifunctional acrylate SR399 manufactured by Sartomer Company) | |
| Additive (dispersion improver) | 0.7 part |
| (Chemistry L-20 manufactured by Soken Chemical & Engineering Co., Ltd.) | |
| Initiator | 1.6 parts |
| (2-benzyl-2-dimethylamino-1-(4-morpholinophenyl)-butanone-1) | |
| Initiator (4,4'-diethylaminobenzophenone) | 0.3 part |
| Initiator (2,4-diethylthioxanthone) | 0.1 part |
| Solvent (ethylene glycol monobutyl ether) | 75.8 parts |

<Red pattern forming photoresist>

| | |
|---|---|
| Red pigment (C.I. PR254) | 3.5 parts |
| (Chromophthal DPR Red BP manufactured by Ciba Specialty Chemicals) | |
| Yellow pigment (C.I. PY139) | 0.6 part |
| (Paliotol Yellow D1819 manufactured by BASF) | |
| Dispersant | 3.0 parts |
| (Sol Sperse 24000 manufactured by Zeneca) | |
| Polymer 1 (shown below) | 5.0 parts |
| Monomer | 4.0 parts |
| (Multifunctional acrylate SR399 manufactured by Sartomer Company) | |
| Initiator | 1.4 parts |
| (Irgacure 907 manufactured by Ciba Specialty Chemicals) | |
| Initiator | 0.6 parts |
| (2,2'-bis(o-chlorophenyl)-4,5,4',5'-tetraphenyl-1,2'-biimidazole) | |
| Solvent | 80.0 parts |

(Propylene Glycol Monomethyl Ether Acetate)

Polymer 1 comprises 19.6 mol % 2-methacryloyloxyethyl isocyanate added to 100 mol % benzylmethacrylate/styrene/acrylic acid/2-hydroxyethyl methacrylate (15.6/37.0/30.5/16.9 (molar ratio)) copolymer, and the weight-average molecular weight is 42500.

<Green Pattern Forming Photoresist>

The following pigments were used in the following compounding amounts in place of the red and yellow pigments in the red pattern forming photoresist described above.

| | |
|---|---|
| Green pigment (C.I. PG7) | 3.7 parts |
| (Seika Fast Green 5316P manufactured by Dainichiseika Color & Chemicals Mfg. Co., Ltd.) | |
| Yellow pigment (C.I. PY139) | 2.3 parts |
| (Paliotol Yellow D1819 manufactured by BASF) | |

<Blue Pattern Forming Photoresist>

The following pigments were used in the following compounding amounts in place of the red and yellow pigments and the dispersant in the red pattern forming photoresist described above.

| | |
|---|---|
| Blue pigment (C.I. PB15:6) | 4.6 parts |
| (Heliogen Blue L6700F manufactured by BASF) | |
| Violet pigment (C.I. PV23) | 1.4 parts |
| (Foster Palm RL-NF manufactured by Clariant) | |
| Pigment derivative | 0.6 parts |
| (Sol Sperse 12000 manufactured by Zeneca) | |
| Dispersant | 2.4 parts |
| (Sol Sperse 24000 manufactured by Zeneca) | |

A melt-formed aluminosilicate thin glass of 0.7 mm in thickness (Item No. 1737 manufactured by US Corning, Inc) was used as substrate and washed, and the substrate was coated by spin coating with the black matrix forming photoresist, then pre-baked under the conditions of a temperature of 90° C. and a heating time of 3 minutes, exposed via a predetermined pattern to UV rays in an irradiation dose of 100 mJ/cm$^2$, subjected to spray development with 0.05% aqueous KOH for 60 seconds, and post-baked under the conditions of a temperature of 200° C. and a heating time of 30 minutes, whereby a black matrix of 1.2 μm in thickness having an opening corresponding to pixel was formed.

Then, the red pattern forming photoresist was applied by spin coating onto the black matrix formed on the substrate, then pre-baked under the conditions of a temperature of 80° C. and a heating time of 5 minutes, subjected via a predetermined pattern to alignment exposure to light in an irradiation dose of 300 mJ/cm$^2$, subjected to spray development with 0.1% aqueous KOH for 60 seconds, and post-baked under the conditions of a temperature of 200° C. and a heating time of 60 minutes, whereby a red pattern of 2.31 μm in thickness at a position corresponding to the predetermined opening of the black matrix was formed.

Subsequently, the green pattern forming photoresist was used to form a green pattern of 2.62 μm in thickness in the same manner as in the process of forming the red pattern, and thereafter, the blue pattern forming photoresist was used to form a blue pattern of 2.90 μm in thickness, and each color pattern of red, green and blue was formed so as to be arranged on a position corresponding to a different opening of the black matrix to form a color filter layer having a pattern of 3 colors of red, green and blue arranged thereon.

An orientation film-forming ink composition based on soluble polyimide resin (Item No. AL1254 manufactured by JSR) was printed in pattern on a necessary region by flexographic printing on the black matrix and color filter layer formed on the substrate, and then dried to remove the solvent, baked under the conditions of a temperature of 200° C. and a heating time of 1 hour and rubbed to form an orientation film of 700 Å in thickness.

Retardation control layer forming photosensitive resin compositions (1) and (2) were prepared. The photosensitive resin composition (1) was prepared by mixing 75 parts of a liquid crystalline material having a mesogen in the center, a polymerizable acrylate group at each terminus and a spacer between the mesogen in the center and the terminal acrylate group, 1 part of photopolymerization initiators (1-hydroxycyclohexyl phenyl ketone and Irgacure 184 manufactured by Ciba Specialty Chemicals) and 25 parts of toluene as solvent. The photosensitive resin composition (2) used in Example 2 was prepared by mixing 5 parts of a chiral material having a polymerizable acrylate group at each terminus with the same composition as the photosensitive resin composition (1).

The retardation control layer-forming photosensitive resin composition (1) was applied by spin coating onto the orientation film, and then the whole of the sample with the substrate was placed on a hot plate, heated under the conditions of a temperature of 100° C. and a heating time of 5 minutes to remove the solvent thereby forming a crystalline structure in the coating. Thereafter, the whole surface of the sample was irradiated with UV rays of a wavelength of 365 nm in an irradiation dose of 10 J/cm², and after irradiation, the whole of the sample with the substrate was placed on a hot plate at a temperature of 200° C. and completely dried by heating for 10 minutes, to form a retardation control layer (1) having a thickness of 1.28 µm on the red pattern, a thickness of 1.06 µm on the green pattern and a thickness of 0.80 µm on the green pattern.

By the color filter accompanied by the retardation control layer (1) thus obtained, high-quality circularly polarized light of each color of red, green and blue was obtained.

Example 2

Color Filter Having Retardation Control Functions for Vertically Oriented Mode Liquid Crystalline Display A color filter layer consisting of color patterns, that is, a red pattern of 2.4 µm in thickness, a green pattern of 2.6 µm in thickness, and a blue pattern of 2.9 µm in thickness, was formed in the same manner as in Example 1. In the photoresists for forming these color patterns, the amounts of the pigments blended in Example 1 were regulated to attain even spectral properties.

Using the photosensitive resin composition (1) used in Example 1, a first retardation control layer (1) (positive A plate) having a thickness of 0.86 µm on the red pattern, a thickness of 0.70 µm on the green pattern and a thickness of 0.50 µm on the blue pattern was formed on the color filter layer in the same manner as in Example 1. Using the photosensitive resin composition (2), a second retardation control layer (2) (negative C plate) having a thickness of 2.4 µm (measured on the green pattern) was formed in an analogous manner on the first retardation control layer.

By the color filter accompanied by the retardation control layers (1) and (2) thus obtained, high-quality optical compensation is feasible with reduced wavelength scattering of the A plate.

Example 3

Color Filter Shown in FIG. 7

A color filter layer consisting of color patterns, that is, a red pattern of 2.8 µm in thickness, a green pattern of 2.6 µm in thickness and a blue pattern of 2.3 µm in thickness, was formed in the same manner as in Example 2. Using the photosensitive resin composition (2), a retardation control layer (negative C plate) having a thickness of 2.3 µm on the red pattern, a thickness of 2.4 µm on the green pattern and a thickness of 2.6 µm on the blue pattern was formed on the color filter layer.

By the color filter accompanied by the negative retardation control layer thus obtained, the retardation of the negative C plate is optimized with respect to red, green and blue, thus enabling reduction in wavelength scattering.

What is claimed is:

1. A color filter comprising:
   a color filter layer composed of a plurality of arranged light transmission patterns, and
   a first retardation control layer including a liquid crystalline polymer, which is laminated as one continuous layer on the color filter layer, and
   wherein the thickness of the first retardation control layer is made dependent upon a predetermined amount of retardation of the first retardation control layer and a wavelength of light for an adjacently disposed light transmission pattern.

2. The color filter according to claim 1, wherein the thickness of the light transmission patterns are made so the total thickness of the color filter layer and the first retardation control layer is constant.

3. The color filter according to claim 1, wherein the color filter layer is composed of the light transmission pattern of each color of red, green and blue, and the thickness of the light transmission pattern of each color is in the order of blue color>green color>red color.

4. The color filter according to claim 1, wherein the color filter layer is composed of the light transmission pattern of each color of red, green and blue, and the thickness of the light transmission pattern of each color is in the order of red color>green color>blue color.

5. The color filter according to claim 1, wherein the first retardation control layer has an optical axis which is parallel to the first retardation control layer.

6. The color filter according to claim 1, wherein a second retardation control layer including a liquid crystalline polymer is further laminated on the first retardation control layer retardation control function, and the two layers function different from each other.

7. The color filter according to claim 6, wherein the first retardation control layer has an optical axis perpendicular to the first retardation control layer.

8. The color filter according to claim 6, wherein an orientation film is laminated between the two retardation control layers.

9. The color filter comprising a retardation control layer according to claim 1, wherein the first retardation control layer has an optical axis which is perpendicular to the first retardation control layer.

10. The color filter according to claim 9, wherein a second retardation control layer whose optical axis is parallel to the second retardation control layer is further laminated in the opposite side of the substrate to the color filter layer.

11. The color filter according to claim 1, wherein the first retardation control layer is laminated except on a peripheral region of the substrate.

12. The color filter according to claim 1, wherein the first retardation control layer is laminated except on a region of the substrate to be sealed and/or a region to be laminated with an electroconductive material.

13. A display having the color filter according to claim 1.

14. An electroluminescence display having the color filter according to claim 1.

15. A liquid crystalline display having the color filter according to claim 1.

16. A vertically oriented mode liquid crystalline display having the color fitter according to claim 1.

17. A method for manufacturing a color filter comprising:
arranging on a substrate a plurality of light transmission patterns different in thickness depending on color, to form a color filter layer, and
laminating a retardation control layer including a liquid crystalline polymer as one continuous layer on the color filter layer, so that the thickness of the retardation control layer is made dependent upon a predetermined amount of retardation of the retardation control layer and a wavelength of light for an adjacently disposed light transmission pattern.

* * * * *